US012434473B2

(12) United States Patent
Ando

(10) Patent No.: US 12,434,473 B2
(45) Date of Patent: Oct. 7, 2025

(54) IMAGE FORMING APPARATUS, IMAGE FORMING METHOD, AND NON-TRANSITORY RECORDING MEDIUM

(71) Applicant: Hiroshi Ando, Kanagawa (JP)

(72) Inventor: Hiroshi Ando, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

(21) Appl. No.: 18/360,072

(22) Filed: Jul. 27, 2023

(65) Prior Publication Data

US 2024/0123728 A1 Apr. 18, 2024

(30) Foreign Application Priority Data

Oct. 17, 2022 (JP) ................................ 2022-166338

(51) Int. Cl.
*B41J 25/304* (2006.01)
*B41J 2/045* (2006.01)
*B41J 2/125* (2006.01)

(52) U.S. Cl.
CPC ....... *B41J 2/04556* (2013.01); *B41J 2/04541* (2013.01); *B41J 2/125* (2013.01); *B41J 25/304* (2013.01); *B41J 2203/01* (2020.08)

(58) Field of Classification Search
CPC ........ B41J 25/304; B41J 25/308; B41J 29/38; B41J 2/04556; B41J 11/0095; B41J 3/4073; B41J 3/4078; B41J 2203/011
See application file for complete search history.

(56) References Cited

U.S. PATENT DOCUMENTS

2013/0147874 A1 6/2013 Andoh
2015/0009252 A1 1/2015 Andoh et al.
2015/0177136 A1 6/2015 Andoh et al.
2015/0224802 A1 8/2015 Kawamichi et al.
2015/0290929 A1 10/2015 Ando
2022/0337707 A1 10/2022 Ando
2023/0150786 A1* 5/2023 Murzynowski .......... B41J 11/04 347/104
2023/0271433 A1* 8/2023 las Murria de las Heras .............. B41J 11/0035 347/19

FOREIGN PATENT DOCUMENTS

JP 2002-046260 A 2/2002
JP 2017-177059 A 10/2017
WO 2013/161622 A1 10/2013

* cited by examiner

*Primary Examiner* — Scott A Richmond
(74) *Attorney, Agent, or Firm* — IPUSA, PLLC

(57) ABSTRACT

An image forming apparatus includes a head, a detector, and circuitry. The head forms an image on a recording medium. The detector detects a vertical movement of the recording medium and a distance to the recording medium in a vertical direction. The detector includes an optical sensor to project light to the recording medium and receive the light reflected from the recording medium. The circuitry sets a first area based on a result of detection performed by the detector. The first area is an area in which the recording medium and the head collide with each other. The circuitry retracts the head to prevent the recording medium and the head from colliding with each other, in a case where a position of the head is in the first area.

9 Claims, 6 Drawing Sheets

IMAGE FORMING APPARATUS, IMAGE FORMING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2022-166338, filed on Oct. 17, 2022, in the Japan Patent Office, the entire disclosure of which is hereby incorporated by reference herein.

BACKGROUND

Technical Field

Embodiments of the present disclosure relate to an image forming apparatus, an image forming method, and a non-transitory recording medium.

Related Art

Inkjet image forming apparatus are known in the art that form images in an inkjet printing system. A rolled sheet may be used for image formation. In one case, the rolled sheet is cut into a given length in a cutting process and images are formed. Some techniques have been proposed that prevent a head for an ink jet system (hereinafter referred to simply as a head) from contacting the rolled sheet and being damaged.

SUMMARY

According to an embodiment of the present disclosure, an image forming apparatus includes a head, a detector, and circuitry. The head forms an image on a recording medium. The detector detects a vertical movement of the recording medium and a distance to the recording medium in a vertical direction. The detector includes an optical sensor to project light to the recording medium and receive the light reflected from the recording medium. The circuitry sets a first area based on a result of detection performed by the detector. The first area is an area in which the recording medium and the head collide with each other. The circuitry retracts the head to prevent the recording medium and the head from colliding with each other, in a case where a position of the head is in the first area.

According to an embodiment of the present disclosure, an image forming method includes, detecting, with an optical sensor, a vertical movement of a recording medium and a distance to the recording medium in a vertical direction, setting a first area based on a result of the detecting, the first area being an area in which the recording medium and a head collide with each other, retracting the head to prevent the recording medium and the head from colliding with each other, in a case where a position of the head is in the first area, and forming, with the head, an image on the recording medium.

According to an embodiment of the present disclosure, a non-transitory recording medium stores a plurality of instructions which, when executed by one or more processors, causes the processors to perform the image forming method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
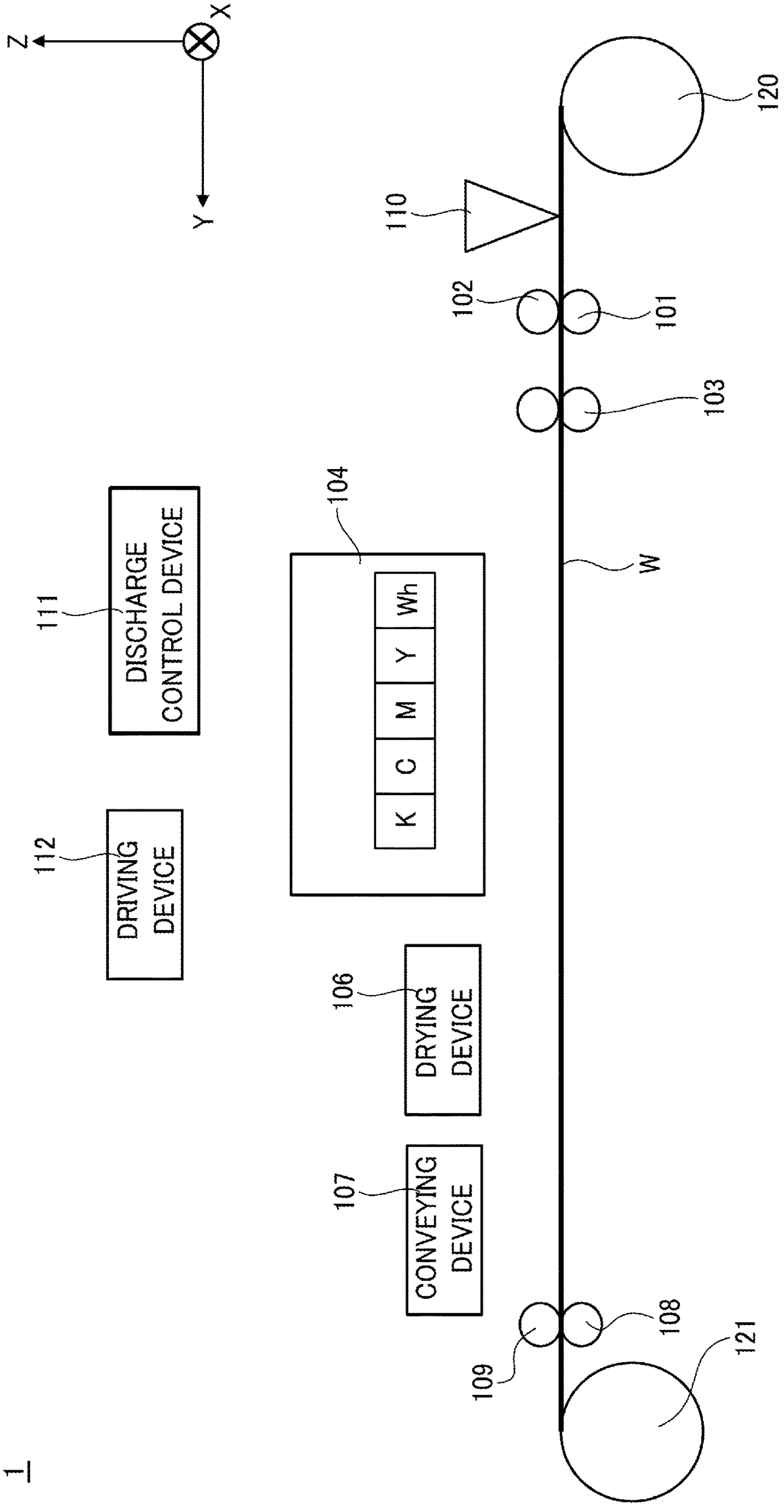
FIG. 1 is a schematic diagram illustrating a part of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below.

As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

In the following description, suffixes Wh, Y, M, C, and K denote colors of white, yellow, magenta, cyan, and black, respectively. To simplify the description, these suffixes are omitted unless necessary.

As used herein, the term "connected/coupled" includes both direct connections and connections in which there are one or more intermediate connecting elements.

Initially, a description is given of a configuration of an image forming apparatus according to an embodiment of the present disclosure.

FIG. 1 is a schematic diagram illustrating a part of an image forming apparatus 1 according to the present embodiment.

One or more embodiments of the present disclosure will be described with the image forming apparatus 1 illustrated in FIG. 1 as an example.

The image forming apparatus 1 is an inkjet image forming apparatus that discharges ink onto a sheet W and forms an image on the sheet W according to input image data.

In the following description, a direction in which the sheet W is conveyed may be referred to as a "conveyance direction" or a "Y-axis direction." A direction orthogonal to the Y-axis direction and corresponding to the width direction of the sheet W may be referred to as an "orthogonal direction" or an "X-axis direction." A direction perpendicular to a surface of the sheet W (a surface including an image forming face) and orthogonal to each of the conveyance direction (Y-axis direction) and the orthogonal direction (X-axis direction) may be referred to as a "perpendicular direction" or a "Z-axis direction."

For example, the sheet W is conveyed in the Y-axis direction from a sheet feeding device by a sheet feeding roller 120 and an output roller 121. Conveyors such as a first conveyance roller 101, a second conveyance roller 102, and a third conveyance roller pair 103 are disposed in the Y-axis direction. The sheet W includes a plurality of recording media joined in the conveyance direction.

Specifically, the first conveyance roller 101 is driven and rotated by a motor that is coupled to the first conveyance roller 101. The second conveyance roller 102 and the third conveyance roller pair 103 are driven rollers that are rotated by the sheet W conveyed.

The image forming apparatus 1 includes an encoder to measure the amount of conveyance of the sheet W. For example, the encoder is disposed between the first conveyance roller 101 and a printing device 104. Alternatively, the encoder may be disposed between the printing device 104 and the output roller 121.

When the sheet W is conveyed, the printing device 104, including a head (such as a head 305 in FIG. 6), discharges ink from the head and forms an image according to image data. Specifically, the printing device 104 discharges inks of white (Wh), yellow (Y), magenta (M), cyan (C), and black (K) from heads of an inkjet head array and forms an image. Alternatively, the printing device 104 may form an image in a single color or a combination of colors other than the aforementioned colors.

The image forming apparatus 1 may include a post-processing device such as a drying device 106. Specifically, the drying device 106 performs a process of drying the sheet W after the printing device 104 applies ink.

The post-processing device may be a device that performs post-processing other than drying.

In the image forming apparatus 1, a first output roller 108 and a second output roller 109 eject or output the sheet W. The output roller 121 winds the ejected sheet W.

The conveyance of the sheet W is controlled by a conveying device 107. For example, the conveying device 107 controls an actuator that rotates the rollers to control the amount of conveyance or the speed of conveyance.

The image forming apparatus 1 includes a discharge control device 111. The discharge control device 111 controls the time when the heads discharge the inks of the respective colors.

The image forming apparatus 1 includes a driving device 112. The driving device 112 includes a controller and an actuator to move the printing device 104 in the vertical direction. Note that the driving device 112 may include any other components to move the printing device 104.

Figure 2:
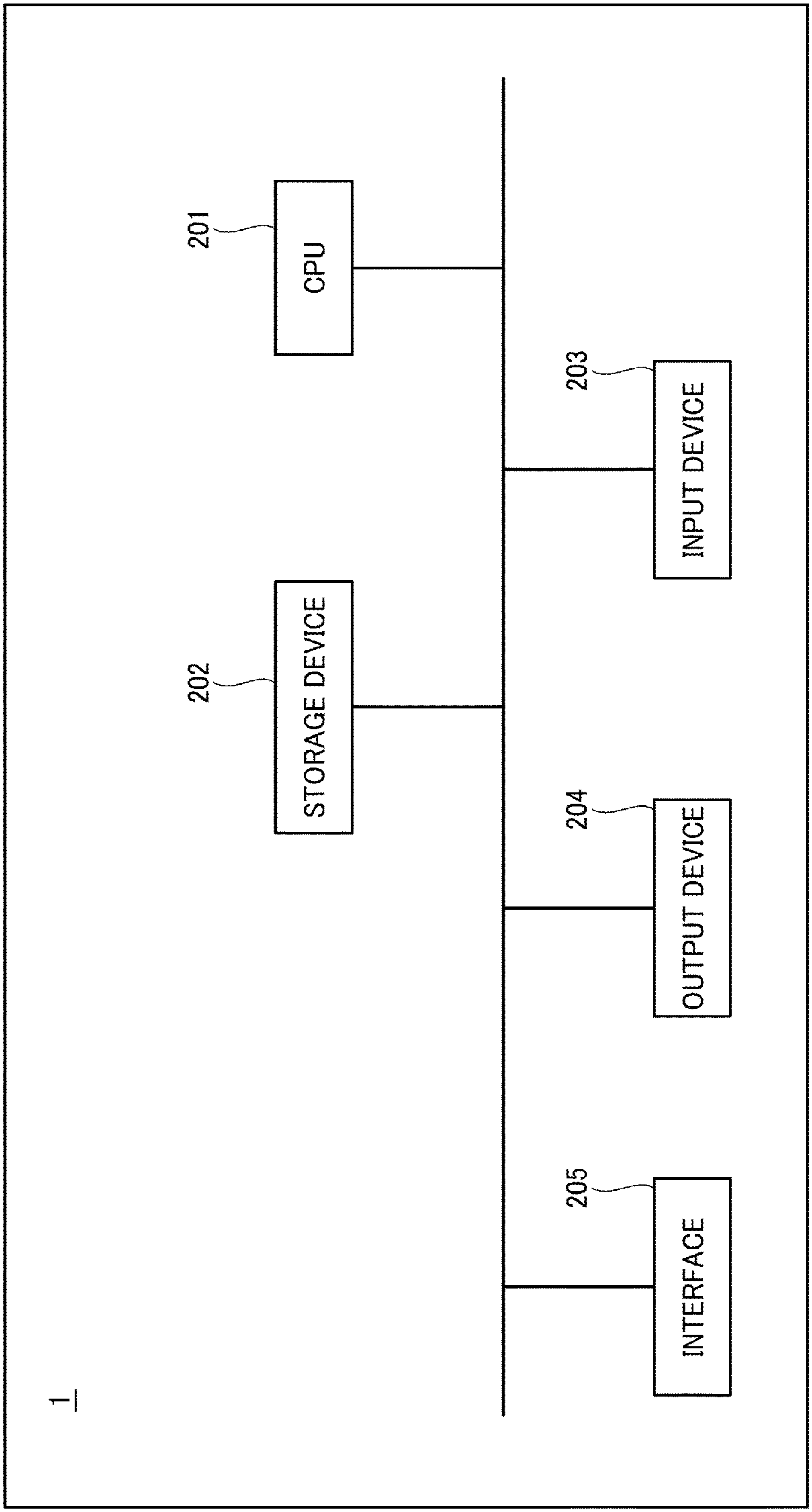
FIG. 2 is a block diagram illustrating a hardware configuration according to an embodiment of the present disclosure.

FIG. 2 is a block diagram illustrating a hardware configuration of a control section of the image forming apparatus 1 according to the present embodiment.

Specifically, the image forming apparatus 1 includes a central processing unit (CPU) 201, a storage device 202, an input device 203, an output device 204, and an interface 205. The hardware resources are electrically connected to each other via a bus.

The CPU 201 serves as an arithmetic device and a control device. The CPU 201 executes processes that can be implemented in the image forming apparatus 1 based on, for example, programs.

The storage device 202 is, for example, a memory. The storage device 202 stores, for example, the programs and data that is used by the CPU 201. The storage device 202 may include an auxiliary storage device such as a hard disk.

The input device 203 is a device that receives user operations, such as a control panel.

The output device 204 is a device that outputs, for example, a result of processing for a user, such as various devices used for printing such as the printing device 104.

The interface 205, such as a network interface circuit, transmits and receives data to and from an external device through wired or wireless communication.

With the hardware resources described above, the image forming apparatus 1 causes the arithmetic device, the control device, and the storage device to cooperate with each other based on a program to execute processing.

The hardware configuration is not limited to the configuration illustrated in FIG. 2. For example, the hardware configuration may include an arithmetic device, a control device, a storage device, an input device, an output device, and an auxiliary device.

A description is given below of a configuration of a sensor according to the present embodiment.

The image forming apparatus 1 includes a sensor 110 that detects the vertical movement and the distance of the sheet W in the vertical direction. The distance of the sheet W is a value indicating the position of the surface of the sheet W in the vertical direction.

A description is given below of a configuration in a case where two optical sensors are provided as the sensor 110.

Figure 3:
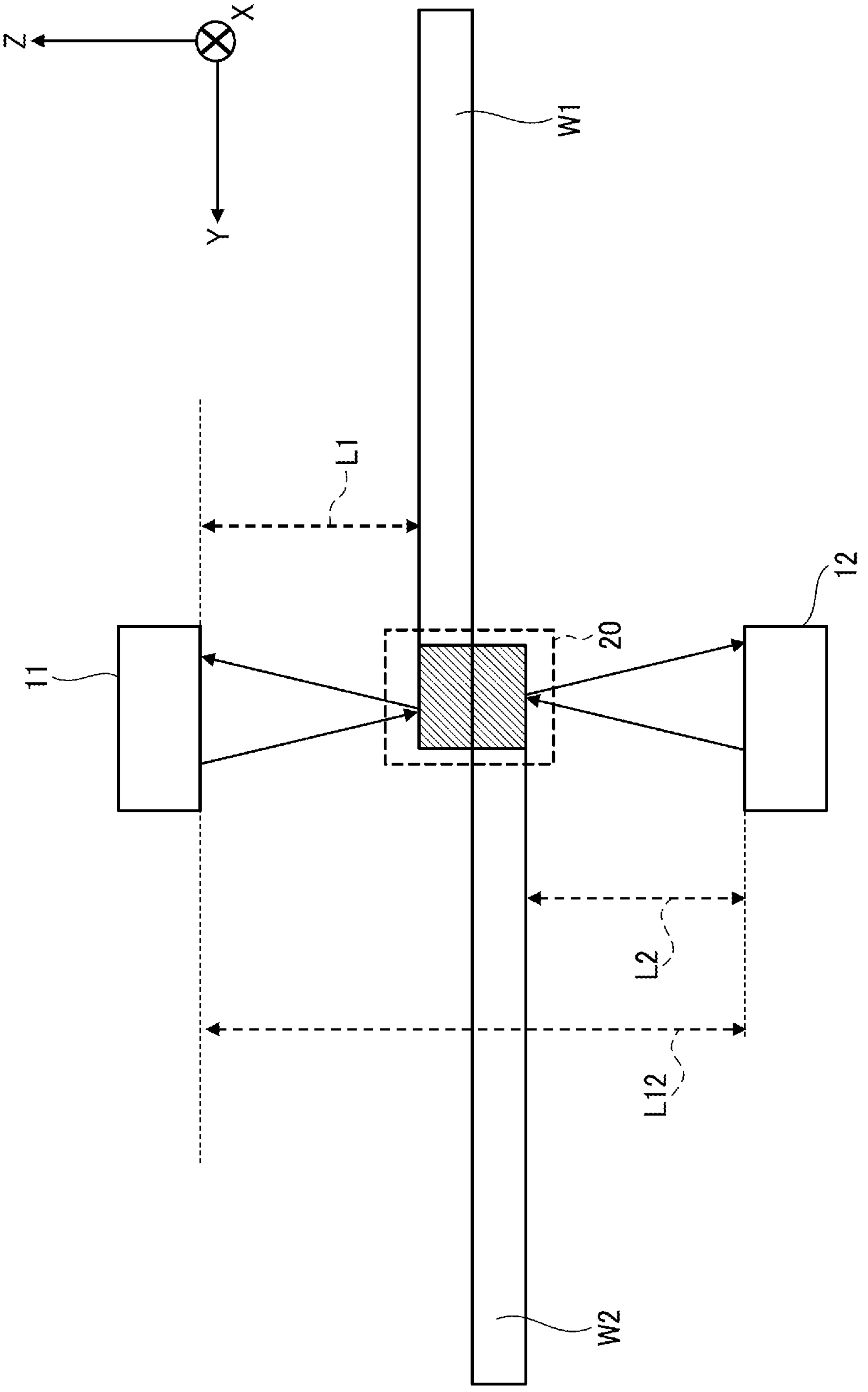
FIG. 3 is a diagram illustrating a configuration of a sensor according to an embodiment of the present disclosure.

As illustrated in FIG. 3, a first distance L1 is a distance between a light emitting and receiving face of a first optical sensor 11 and a splice 20, whereas a second distance L2 is a distance between a light emitting and receiving face of a second optical sensor 12 and the splice 20. The splice 20 is a joint portion of a rolled sheet. For example, the sensor 110 is disposed downstream from the sheet feeding roller 120 and upstream from the first conveyance roller 101 and the second conveyance roller 102 in the conveyance direction. Alternatively, the sensor 110 may be disposed at a location other than the aforementioned location or at a plurality of locations. For example, the sensor 110 has the following configuration.

FIG. 3 is a diagram illustrating a configuration of the sensor 110 according to the present embodiment. In the following description, one side of the sheet W is referred to as a "first side" whereas another side of the sheet W is referred to as a "second side." The first side may be also referred to as an "A side" or a "front side" whereas the second side may be referred to as a "B side" or a "back side."

The sensor 110 preferably measures both the first side and the second side of the sheet W. Specifically, the sensor 110 includes an optical sensor for detecting the first side of the sheet W and another optical sensor for detecting the second side of the sheet W. Such sensors for detecting both sides of the sheet W detect the difference between the vertical movement and the splice 20 with high accuracy. More specifically, the first optical sensor 11 projects light onto the first side of the sheet W. A first distance L1, which is measured by the first optical sensor 11, is a distance between the first optical sensor 11 and the first side of the sheet W. On the other hand, the second optical sensor 12 projects light onto the second side of the second side of the sheet W. A second distance L2, which is measured by the second optical sensor 12, is a distance between the second optical sensor 12 and the second side of the sheet W.

The first optical sensor 11 and the second optical sensor 12 are of a laser type or a light emitting diode (LED) type. The first optical sensor 11 detects the distance by receiving light that is projected to and reflected from the first side of the sheet W. Similarly, the second optical sensor 12 detects the distance by receiving light that is projected to and reflected from the second side of the sheet W. The sensor 110 may further include, for example, an ultrasonic sensor.

As illustrated in FIG. 3, a first sheet W1 is an upper sheet at the splice 20 whereas a second sheet W2 is a lower sheet at the splice 20. For example, the first sheet W1 and the second sheet W2 are adhered to each other by a double-sided tape. Alternatively, for example, the first sheet W1 and the second sheet W2 may be bonded together by an adhesive.

In the present embodiment, the splice 20 is a portion at which the first sheet W1, the second sheet W2, and the double-sided tape overlap each other.

Based on the first distance L1 and the second distance L2, the first optical sensor 11 and the second optical sensor 12 respectively calculate the "amount of thickness of recording media" and the "amount of fluttering" (the amount of vertical movement of recording media). The fluttering fluctuates the distance between the head and the image forming face of continuous paper (including a plurality of recording media).

In the following description, the sum of the "amount of thickness of recording media" and the "amount of fluttering" is referred to as "sum D." The distance between the first optical sensor 11 and the second optical sensor 12 is referred to as an "inter-sensor distance L12." The inter-sensor distance L12 is a value determined by the locations of the first optical sensor 11 and the second optical sensor 12.

The sum D may be calculated by Equation (1) below.

$$\text{Sum } D = \text{inter-sensor distance } L12 - \text{first distance } L1 - \text{second distance } L2 \quad (1)$$

In Relation (2) below, the "amount Dw of thickness of one recording medium" is a value determined in advance according to the specification of the sheet W. The "interval Dgap" is a distance between the head and the recording medium. The "sum D" calculated by Equation (1) above is compared with the sum of the "interval Dgap" and the "amount Dw of thickness of one recording medium." In Relation (2) below, when the "sum D" (the left side of Relation (2)) exceeds the sum of the "interval Dgap" and the "amount Dw of thickness of one recording medium" (the right side of Relation (2)), in other words, when the inequality relationship indicated by Relation (2) is satisfied, the image forming apparatus 1 determines that "the recording medium and the head may collide with each other."

$$\text{Sum } D > \text{interval } D\text{gap} + \text{amount } Dw \text{ of thickness of one recording medium} \quad (2)$$

A safety margin may be set in Relation (2) above. In other words, a value as a safety margin may be added to Relation (2) above.

For example, the interval Dgap may be a value in a range of 0.5 millimeters to 1.5 millimeters. The interval Dgap may be set to a value in advance as a specification.

Optical sensors measure distances more accurately than ultrasonic sensors. A highly accurate detection result allows the thickness of the sheet W and the vertical movement of the sheet W to be distinguished therebetween. Thus, the splice 20 can be determined.

Based on the detection result described above, areas are set as follows.

A description is given below of an example of setting a first area, a second area, and a third area, according to the present embodiment.

Figure 4:
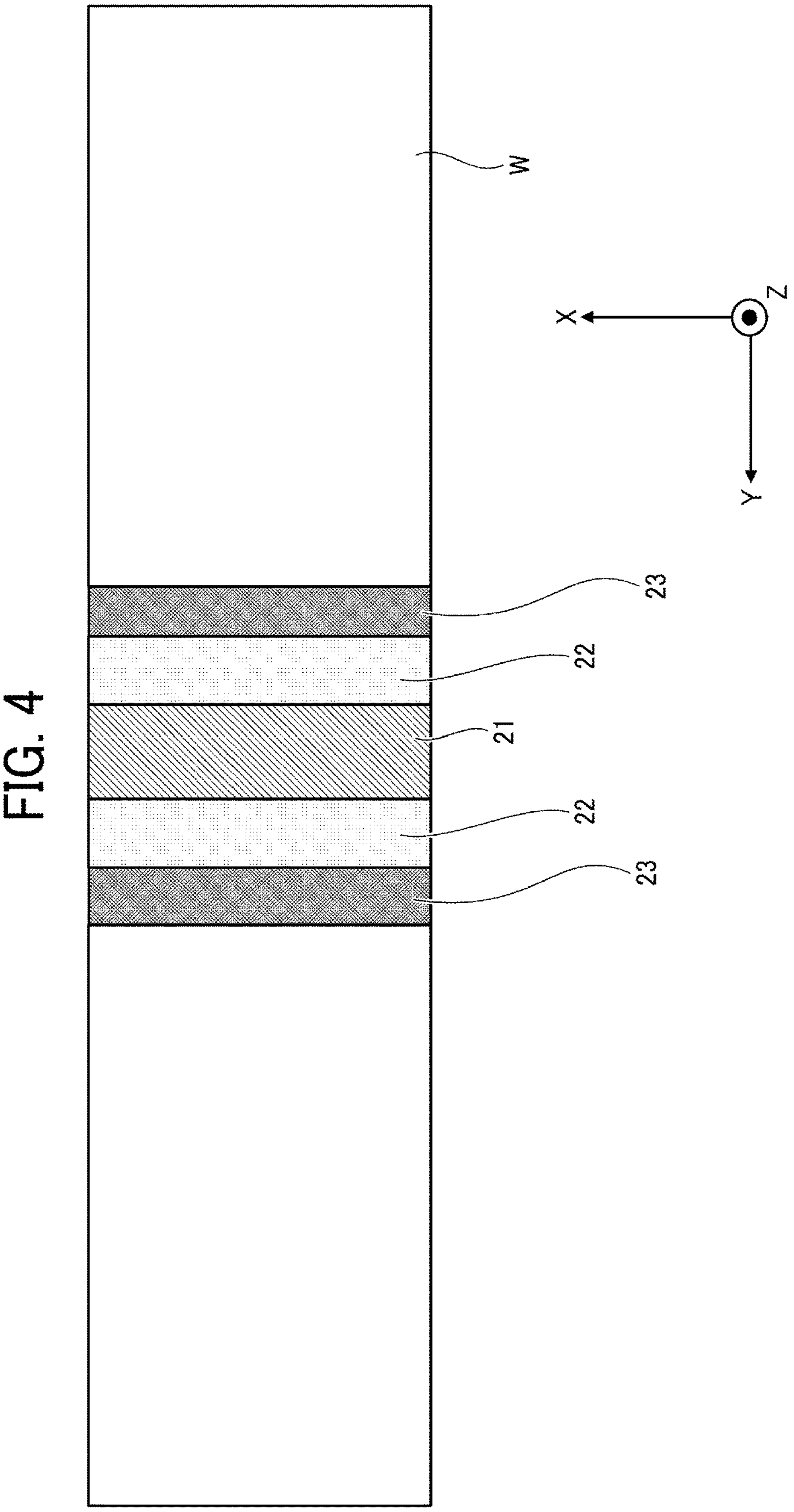
FIG. 4 is a diagram illustrating an example of setting a first area, a second area, and a third area, according to an embodiment of the present disclosure.

FIG. 4 is a diagram illustrating an example of setting the first area, the second area, and the third area.

Based on a result of detection performed by the sensor 110, first, a first area 21 is set in which the sheet W and the head may collide with each other.

The first area 21 is, for example, an area corresponding to a portion including the splice 20 of the sheet W. As illustrated in FIG. 3, a portion including the splice 20 (the part of the splice 20) of the sheet W is thicker than other portions (parts) of the sheet W. For this reason, the portion including the splice 20 may collide with the head when the sheet W is conveyed in a direction along the Y-axis. In particular, in a case where the sheet W includes joined recording media having different thicknesses, the amount of thickness of the sheet W is likely to vary in the conveyance direction. Thus, the sheet W is likely to collide with the head. In the present embodiment, the first area 21 is set and the head is moved to prevent the sheet W from colliding with the head. Thus, a collision between the head and the recording medium is prevented during the image formation.

Preferably, the image forming apparatus 1 further sets a second area 22 separately from the first area 21. A portion other than the splice 20 of the sheet W may collide with the head. For example, certain areas of the sheet W sandwiching the splice 20 in the conveyance direction may cause the vertical movement of the sheet W and collide with the head. For this reason, given ranges that are opposite each other across the first area 21 in the conveyance direction of the sheet W are set as the second areas 22.

The second area 22 is an area in which the head is retracted from above the sheet W. Since the value of the "sum D" is greater at a portion of the sheet W at which the vertical movement is greater, in other words, at which the fluttering is intense, Relation (2) above is likely to be satisfied.

The area in which Relation (2) is satisfied is set as the second area 22. The head may collide with the second area 22 of the sheet W. For this reason, the head is preferably retracted from the second area 22 like the first area 21. The image forming apparatus 1 performs control to retract the head to a position at which the sheet W does not collide with the head. Specifically, the image forming apparatus 1 moves the head as follows.

When the head is moved and retracted in the X-axis direction, the image forming apparatus 1 moves the head to an area outside the area in which the sheet W exists in the X-axis direction.

When the head is moved and retracted in the Z-axis direction, the image forming apparatus 1 lifts the head from a position at which the head forms an image. In other words, the image forming apparatus 1 moves the head in the Z-axis direction away from the sheet W.

The position to which the head is retracted is set in advance.

In consideration of the vertical movement of the sheet W, the second area 22 is set to be longer than the first area 21 in the conveyance direction. The head may collide with the sheet W because of the vertical movement of the sheet W in addition to the variation in the thickness of the sheet W due to the splice 20. When the head is controlled to retract after the second area 22 is set in consideration of both the splice 20 and the variation in the position of the sheet W in the vertical direction due to the vertical movement, the image forming apparatus 1 can prevent the head from colliding with the sheet W. In other words, the collision between the head and the sheet W is reduced compared with a case in which only the first area 21 is set.

Preferably, the image forming apparatus 1 further sets a third area 23. The third area 23 is an area in which the head is prohibited from forming an image. The third area 23 is determined by Relation (3) below.

$$\text{Sum } D > \text{prohibition interval } Dpgap + \text{amount } Dw \text{ of thickness of one recording medium} \quad (3)$$

Relation (3) is different from Relation (2) above in that the "interval Dgap" in Relation (2) is replaced by the "prohibition interval Dpgap" in Relation (3). The "prohibition interval Dpgap" is a value set in advance. The "prohibition interval Dpgap" is a value smaller than the "interval Dgap." For example, when the "interval Dgap" is a value in a range of 0.5 millimeters to 1.5 millimeters, the "prohibition interval Dpgap" is a value in a range of 0.5 millimeters to 1.0 millimeters. Since Relation (3) above is more likely to be satisfied than Relation (2) above, the third area 23 is set to be wider than the second area.

The third areas 23 are set opposite each other across the first area 21 and the second areas 22 in the conveyance direction. Note that the third areas 23 may be set depending on the amount of vertical movement. Specifically, the third areas 23 may be relatively short in the conveyance direction (with a relatively narrow area) in a case where the amount of vertical movement is relatively small in a configuration in which the "fluttering" is reduced by, for example, extra conveyance rollers. The ratio or area of the first area 21, the second area 22, and the third area 23 may be changed depending on the amount of vertical movement in the detection result instead of the area ratio illustrated in FIG. 4.

Such setting of the first area 21, the second area 22, and the third area 23 narrows the area in which image formation is prohibited and widens the area in which image formation is allowed in a configuration in which extra conveyance rollers are disposed to reduce the vertical movement.

When the ink is discharged to the third area 23, which is an area in which the thickness variation or the vertical movement occurs, the landing position of the ink may deviate from the target position. To prevent such a situation, the image forming apparatus 1 performs control to prohibit image formation by the head in the third area 23 in which the landing position is likely to deviate from the target position. Such control prevents poor quality due to the deviation of the landing position.

Since the image forming apparatus 1 ascertains the time at which the head reaches the set areas described above based on the amount of conveyance and the speed of conveyance, the image forming apparatus 1 can perform control such as retraction of the head or prohibition of image formation.

Preferably, the image forming apparatus 1 detects the amount of thickness of the sheet W and moves the head in the vertical direction to keep a stable distance between the head and the sheet W. Specifically, when detecting an increased amount of thickness of the sheet W, in other words, when detecting the thicker sheet W, the image forming apparatus 1 performs control to lift the head away from the sheet W. By contrast, when detecting a decreased amount of thickness of the sheet W, in other words, when detecting the thinner sheet W, the image forming apparatus 1 performs control to lower the head toward the sheet W.

Such a stable distance between the head and the sheet W keeps a stable distance at which the ink discharged from the head travels to the landing position on the sheet W. Such a stable distance at which the ink discharged from the head travels to the landing position on the sheet W prevents the landing position of the ink from deviating from the target position and thus prevents the deterioration of the image quality. The value of the stable distance is set in advance.

A description is given below of an overall process performed by the image forming apparatus 1 according to the present embodiment.

Figure 5:
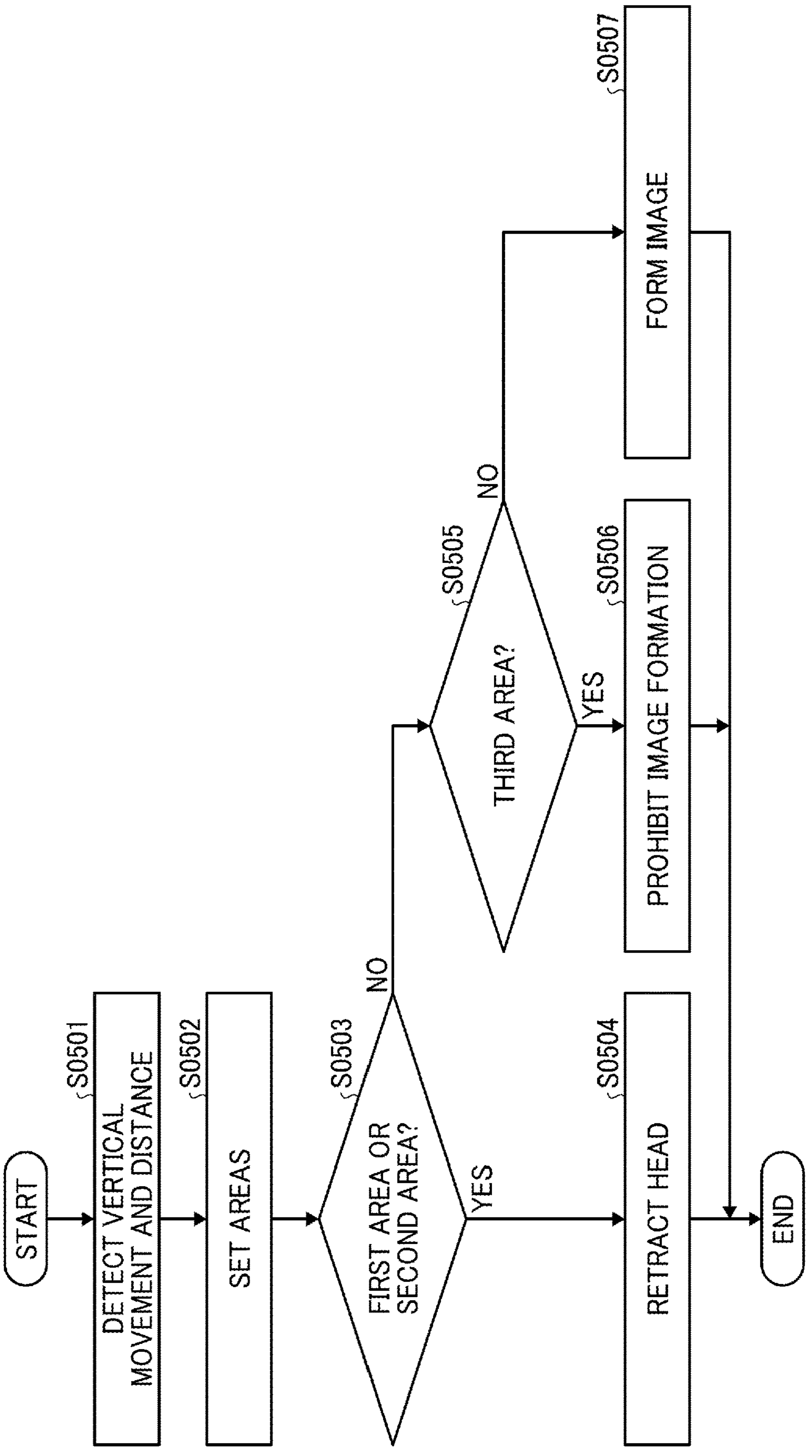
FIG. 5 is a flowchart of an overall process according to an embodiment of the present disclosure.

FIG. 5 is a flowchart of the overall process performed by the CPU 201 according to the present embodiment.

In step S0501, the image forming apparatus 1 detects the vertical movement and the distance. As described below, this step is performed by the sensor 110.

In step S0502, the image forming apparatus 1 sets areas based on the detection result in step S0501. In the present embodiment, the first area, the second area, and the third area are set. Specifically, the CPU 201 determines values of the first area, the second area, and the third area, as described above referring to FIG. 4, and may store such values in any desired memory.

In step S0503, the image forming apparatus 1 determines whether the position of the head is in the first area or the second area. In consideration of, for example, the control for retracting the head and the processing time, the image forming apparatus 1 may execute the determination of step S0503 at a given time before the position of the head reaches the first area or the second area.

When determining that the position of the head is in the first area or the second area (YES in step S0503), the image forming apparatus 1 proceeds to step S0504. By contrast, when determining that the position of the head is in neither the first area nor the second area (NO in step S0503), the image forming apparatus 1 proceeds to step S0505.

In step S0504, the image forming apparatus 1 performs control to retract the head.

In step S0505, the image forming apparatus 1 determines whether the position of the head is in the third area.

When determining that the position of the head is in the third area (YES in step S0505), the image forming apparatus 1 proceeds to step S0506. By contrast, when determining that the position of the head is not in the third area (NO in step S0505), the image forming apparatus 1 proceeds to step S0507.

In step S0506, the image forming apparatus 1 performs control to prohibit image formation. For example, the image forming apparatus 1 controls the head not to discharge ink into the third area. To prohibit image formation, the image forming apparatus 1 may perform control to retract the head.

In step S0507, the image forming apparatus 1 causes the head to form an image. Specifically, the image forming apparatus 1 causes the head to discharge ink to form a designated image on a recording medium according to image data that is input in advance. For example, in a case where the head is retracted, the image forming apparatus 1 moves the head from the retracted position to a position at which the head forms an image, and then determines when to discharge ink.

A description is given below of a functional configuration of the image forming apparatus 1 according to the present embodiment.

Figure 6:
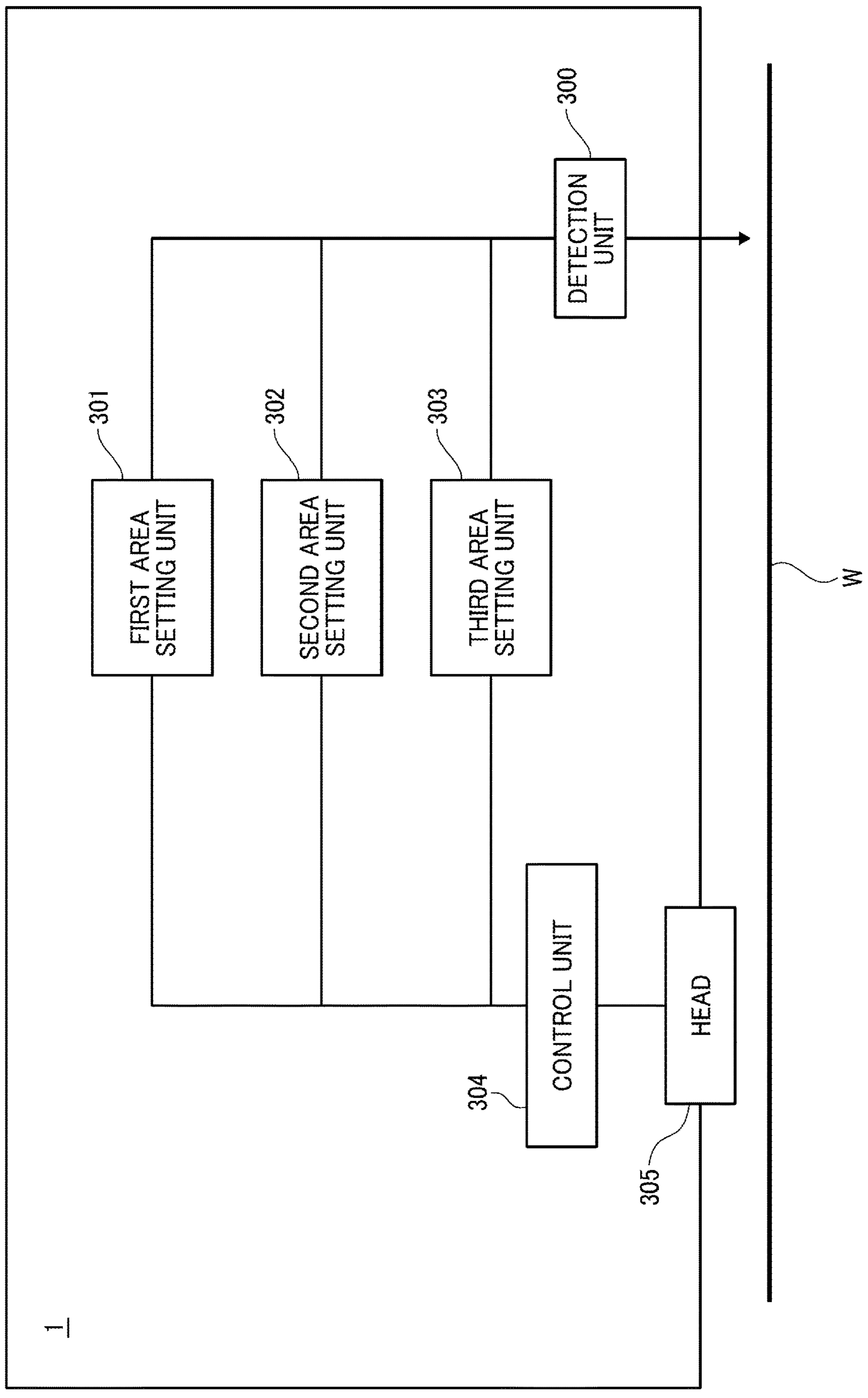
FIG. 6 is a diagram illustrating a functional configuration according to an embodiment of the present disclosure.

FIG. 6 is a diagram illustrating the functional configuration of the image forming apparatus 1 according to the present embodiment.

Specifically, the image forming apparatus 1 has a functional configuration including a detection unit 300, a first area setting unit 301, and a control unit 304. The image forming apparatus 1 preferably has a functional configuration further including a second area setting unit 302 and a third area setting unit 303.

The detection unit 300 performs a detection procedure for detecting the vertical movement and the distance based on a result of projecting light to the sheet W and receiving the reflected light. For example, the detection unit 300 is implemented by the sensor 110.

The first area setting unit 301 performs a first area setting procedure for setting the first area based on a result of detection performed by the detection unit 300. For example, the first area setting unit 301 is implemented by the CPU 201.

The second area setting unit 302 performs a second area setting procedure for setting the second area based on a result of detection performed by the detection unit 300. For example, the second area setting unit 302 is implemented by the CPU 201.

The third area setting unit 303 performs a third area setting procedure for setting the third area based on a result of detection performed by the detection unit 300. For example, the third area setting unit 303 is implemented by the CPU 201.

The control unit 304 performs a control procedure for retracting the head 305 or prohibiting image formation based on the first area, the second area, and the third area. For example, the control unit 304 is implemented by the CPU 201.

With the configuration described above, the image forming apparatus 1 obtains a result of detection performed by the detection unit 300. Based on such a detection result, the image forming apparatus 1 determines the first area, the second area, and the third area as illustrated in FIG. 5. As a result of this determination including the determination of the kind of areas, the control unit 304 can perform control to retract the head to prevent the head and the recording medium from colliding with each other in an area such as the first area in which the head and the recording medium may collide with each other. Thus, the image forming apparatus 1 can prevent the head and the recording medium from colliding with each other during image formation. Similarly, the image forming apparatus 1 can also prevent the head and the recording medium from colliding with each other in the second area during image formation. When the head and the recording medium collide with each other, unfavorable situations may occur such as a discharging failure, a failure of the head, and the occurrence of downtime. The present embodiment reduces the deterioration of image quality, the cost of the head, or the waste of work time due to such unfavorable situations.

With the configuration described above, the image forming apparatus 1 may simply include a common sensor for detecting the thickness of recording media, detecting the splice 20, and detecting the vertical movement.

In addition, with a result of accurate detection of the thickness of recording media, the work time for setting the thickness of recording media can be reduced.

Further, with the configuration described above, the image forming apparatus 1 can accurately detect the first area, the second area, and the third area and set each of the first area, the second area, and the third area to be relatively small. Accordingly, the amount of wastepaper can be reduced.

Furthermore, the image forming apparatus 1 prohibits image formation in an area such as the third area in which image quality is degraded, to prevent the degradation of image quality and enhance the image quality.

A description is given below of some other embodiments of the present disclosure.

The recording medium is, for example, a sheet such as a sheet of plain paper. In addition to a sheet of plain paper, examples of the recording medium include, but are not limited to, a sheet of coated paper, a sheet of label paper, an overhead projector sheet, a film, and a flexible thin plate. In other words, the recording medium is made of, for example, a material to which ink droplets can at least temporarily adhere, a material to which ink droplets adhere and are fixed, or a material which ink droplets adhere to and permeate. Specific examples of the recording medium include, but are not limited to, a recording medium such as a sheet, a film, or cloth, an electronic component such as an electronic substrate or a piezoelectric element, which may be referred to as a piezoelectric component, layered powder, an organ model, and a testing cell. In addition, a three-dimensional object may be formed. In short, the recording medium is made of any material to which liquid can adhere, such as paper, thread, fiber, fabric, leather, metal, plastic, glass, wood, ceramic, or a combination thereof. In addition, the liquid may include, for example, a recording liquid, a fixing treatment liquid, or a resin as a kind other than ink, according to the use described above.

Continuous paper is a so-called rolled sheet. The rolled sheet is a recording medium that is conveyed while being nipped by a sheet-feeding roller pair at a position upstream in the conveyance direction and by an output roller pair at a position downstream in the conveyance direction.

The image forming method described above is implemented by, for example, causing a computer to execute processing. The image forming method according to the embodiments of the present disclosure may include processing other than the processing described above. In addition, the image forming method includes a method in which part of processing is executed by, for example, processing or operation performed by an external device.

The image forming method described above may be implemented by a program for executing the processing described above or the processing equivalent to the processing described above. The program includes firmware and program equivalents and may be referred to simply as a "program" in the following description.

In other words, the image forming method described above may be implemented by, for example, a program written in a programming language so that a given result can be obtained by instructing a computer. Part of processing of the program may be executed by hardware such as an integrated circuit (IC).

The program causes, for example, an arithmetic device, a control device, and a storage device included in a computer to cooperate with each other to cause the computer to execute the processing described above. In other words, the program is loaded into, for example, a main storage device and issues a command to the arithmetic device to cause the arithmetic device to perform an arithmetic operation, thus running the computer.

Alternatively, the program may be provided through a computer-readable recording medium or an electric communication line such as a network.

A description is given below of some aspects of the present disclosure.

According to a first aspect, an image forming apparatus includes a head, a detection unit, a first area setting unit, and a control unit. The head forms an image on a recording medium. The detection unit detects a vertical movement of the recording medium and a distance to the recording medium in a vertical direction. The detection unit includes an optical sensor that projects light to the recording medium and receives the light reflected from the recording medium. The first area setting unit sets a first area based on a result of detection performed by the detection unit. The first area is an area in which the recording medium and the head collide with each other. The control unit retracts the head to prevent the recording medium and the head from colliding with each other, in a case where a position of the head is in the first area.

According to a second aspect, in the image forming apparatus of the first aspect, the first area setting unit sets, based on the distance, the first area including a portion of the recording medium at which a splice is detected.

According to a third aspect, the image forming apparatus of the first or second aspect further includes a second area setting unit that sets, based on the result of detection performed by the detection unit, a second area wider than the first area and from which the head is retracted. In the image forming apparatus of the first or second aspect, the control unit retracts the head, in a case where the position of the head is in the second area.

According to a fourth aspect, the image forming apparatus of the third aspect further includes a third area setting unit that sets, based on the result of detection performed by the detection unit, a third area wider than the second area and in which the head is prohibited from forming the image. In the image forming apparatus of the third aspect, the control unit prohibits the head from forming the image, in a case where the position of the head is in the third area.

According to a fifth aspect, in the image forming apparatus of any one of the first to fourth aspects, the detection unit includes a plurality of optical sensors including the optical sensor to project the light. The plurality of optical sensors includes a first optical sensor and a second optical sensor. The first optical sensor projects the light to a first side of the recording medium to measure a first distance between the first optical sensor and the first side. The second optical sensor projects the light to a second side of the recording medium to measure a second distance between the second optical sensor and the second side. The control unit specifies the first area based on results of measurement of the first distance and the second distance.

According to a sixth aspect, in the image forming apparatus of the fifth aspect, the recording medium is continuous paper. The head discharges liquid onto the recording medium to form the image. The control unit subtracts the first distance and the second distance from an inter-sensor distance between the first optical sensor and the second optical sensor to calculate a sum of an amount of thickness of a plurality of recording media and an amount of the vertical movement of the recording medium. The first area setting unit sets the first area, in a case where the sum exceeds a sum of a distance between the recording medium and the head and an amount of thickness of the recording medium. The control unit moves the head to an area outside the recording medium in a direction orthogonal to a conveyance direction in which the recording medium is conveyed. Alternatively, the control unit lifts the head in a direction perpendicular to a surface of the recording medium from a position at which the head forms the image, to retract the head.

According to a seventh aspect, in the image forming apparatus of any one of the first to sixth aspects, the control unit keeps a stable distance between the recording medium and the head based on the result of detection performed by the detection unit.

According to one aspect of the present disclosure, a collision between a head and a recording medium is prevented during image formation.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

a head to form an image on a recording medium;

a detector to detect a vertical movement of the recording medium and a distance to the recording medium in a vertical direction, the detector including an optical sensor to project light to the recording medium and receive the light reflected from the recording medium; and circuitry configured to:

set a first area based on a result of detection performed by the detector, the first area being an area in which the recording medium and the head collide with each other;

retract the head to prevent the recording medium and the head from colliding with each other, in a case where a position of the head is in the first area, set, based on the result of detection performed by the detector, a second area wider than the first area and from which the head is retracted, and retract the head, in a case where the position of the head is in the second area.

2. The image forming apparatus according to claim 1, wherein the circuitry is configured to set, based on the distance, the first area including a portion of the recording medium at which a splice is detected.

3. The image forming apparatus according to claim 1, wherein the circuitry is configured to set, based on the result of detection performed by the detector, a third area wider than the second area and in which the head is prohibited from forming the image, and wherein the circuitry is configured to prohibit the head from forming the image, in a case where the position of the head is in the third area.

4. The image forming apparatus according to claim 1, wherein the detector includes a plurality of optical sensors including the optical sensor to project the light, wherein the plurality of optical sensors includes a first optical sensor and a second optical sensor, wherein the first optical sensor projects the light to a first side of the recording medium to measure a first distance between the first optical sensor and the first side, wherein the second optical sensor projects the light to a second side of the recording medium to measure a second distance between the second optical sensor and the second side, and wherein the circuitry is configured to specify the first area based on results of measurement of the first distance and the second distance.

5. The image forming apparatus according to claim 4, wherein the recording medium is continuous paper, wherein the head discharges liquid onto the recording medium to form the image, wherein the circuitry is configured to subtract the first distance and the second distance from an inter-sensor distance between the first optical sensor and the second optical sensor to calculate a sum of an amount of thickness of a plurality of recording media and an amount of the vertical movement of the recording medium, wherein the circuitry is configured to set the first area, in a case where the sum exceeds a sum of a distance between the recording medium and the head and an amount of thickness of the recording medium, and wherein the circuitry is configured to move the head to an area outside the recording medium in a direction orthogonal to a conveyance direction in which the recording medium is conveyed, to retract the head.

6. The image forming apparatus according to claim 4, wherein the recording medium is continuous paper, wherein the head discharges liquid onto the recording medium to form the image, wherein the circuitry is configured to subtract the first distance and the second distance from an inter-sensor distance between the first optical sensor and the second optical sensor to calculate a sum of an amount of thickness of a plurality of recording media and an amount of the vertical movement of the recording medium, wherein the circuitry is configured to set the first area, in a case where the sum exceeds a sum of a distance between the recording medium and the head and an amount of thickness of the recording medium, and wherein the circuitry is configured to lift the head in a direction perpendicular to a surface of the recording medium from a position at which the head forms the image, to retract the head.

7. The image forming apparatus according to claim 1, wherein the circuitry is configured to keep a stable distance between the recording medium and the head based on the result of detection performed by the detector.

8. An image forming method, comprising:

detecting, with an optical sensor, a vertical movement of a recording medium and a distance to the recording medium in a vertical direction;

setting a first area based on a result of the detecting, the first area being an area in which the recording medium and a head collide with each other;

retracting the head to prevent the recording medium and the head from colliding with each other, in a case where a position of the head is in the first area;

setting, based on the result of detection performed by the detector, a second area wider than the first area and from which the head is retracted;

retracting the head, in a case where the position of the head is in the second area, and forming, with the head, an image on the recording medium.

9. A non-transitory recording medium storing a plurality of instructions which, when executed by one or more processors, causes the processors to perform an image forming method, the method comprising:

detecting, with an optical sensor, a vertical movement of a recording medium and a distance to the recording medium in a vertical direction;

setting a first area based on a result of the detecting, the first area being an area in which the recording medium and a head collide with each other;

retracting the head to prevent the recording medium and the head from colliding with each other, in a case where a position of the head is in the first area;

setting, based on the result of detection performed by the detector, a second area wider than the first area and from which the head is retracted;

retracting the head, in a case where the position of the head is in the second area, and forming, with the head, an image on the recording medium.

* * * * *